United States Patent Office 3,050,386
Patented Aug. 21, 1962

3,050,386
METHOD OF PRODUCING SINTER ELECTRODES
Hans Hermann von Döhren and Christa Walther, Frankfurt am Main, Germany, assignors to Accumulatoren Fabrik A.G., Hagen, Westphalia, Germany
No Drawing. Filed Nov. 23, 1959, Ser. No. 854,609
Claims priority, application Germany Nov. 22, 1958
15 Claims. (Cl. 75—223)

The present invention relates to a method of producing sintered metal bodies and more particularly to producing sintered electrodes such as can be used in alkaline storage batteries.

Such sintered electrodes are made by sintering finely subdivided metal powders, for instance the conventionally used iron or nickel powders, and several methods are known for the production of such sintered electrode bodies. The metal powder which is to be sintered possesses a very large surface area due to the smallness of the individual metal particles and thus frequently is highly susceptible to surface oxidation phenomena. Such surface oxidation may take place to a limited extent already at ambient temperature and, of course, would take place at a greatly accelerated rate at the elevated temperatures to which the metal powder must be heated during sintering of the same. Since it is essential that the electrode produced in this manner will be free or at least substantially free of metal oxides, i.e. the sintered metal body must have a surface consisting of the metal and not of metal oxide, it has been suggested to work—and in fact the production of sintered electrodes is usually carried out—in a reducing atmosphere such as a hydrogen atmosphere. However, working at sintering temperatures in a hydrogen atmosphere requires special precautions and still the danger of explosions cannot be completely avoided.

Thus, while operating in a hydrogen atmosphere will assure that the sintered body will be free of an oxide skin, the process is complicated, to some extent dangerous and involves expenses in connection with providing the hydrogen atmosphere. Nevertheless, such reducing atmosphere usually must be provided since the individual metal particles will not properly sinter together if their contacting surface portions are covered with an oxide skin.

It is therefore an object of the present invention to overcome the above mentioned difficulties encountered in the production of sintered metal bodies, particularly sinter electrodes.

It is another object of the present invention to provide a method according to which sintered electrodes or sintered metal bodies suitable for use as sinter electrodes can be produced in a simple and economical manner and without the explosion hazards inherent in the use of a hydrogen gas atmosphere during the sinter process.

It is a further object of the present invention to provide a method for producing sintered metal bodies from a pulverulent mixture which during sintering will be capable of reducing any oxide skin or oxide surface layer on the metal particles which are to be sintered and of course also to prevent any oxidation of the metal particles, so that the metal particles can be sintered together and firm adherence between the individual particles of the sinter body is assured.

Other objects and advantages of the present invention will become apparent from a further reading of the description and of the appended claims.

With the above and other objects in view, the present invention contemplates a method of producing sintered metal bodies, comprising the steps of forming an intimate mixture of a metal powder adapted to be sintered and of a pulverulent organic compound adapted upon heating to the sintering temperature of the metal powder to give off a reducing gas, and heating the thus formed mixture to the sintering temperature of the metal powder so as to sinter the same and simultaneously to release the reducing gas, the latter preventing oxidation of the metal, whereby a sintered metal body substantially free of oxides of the metal is formed.

According to a preferred embodiment of carrying out the method of the present invention, the same comprises the steps of forming an intimate mixture between 97 and 70 percent by weight of a pulverulent metal selected from the group consisting of iron, nickel, zinc, cobalt, titanium, tantalum, tungsten, molybdenum, copper and silver, and of between 3 and 30 percent by weight of a pulverulent metal-organic compound adapted upon heating to the sintering temperature of the pulverulent metal to be decomposed under formation of a metal and of a reducing gas adapted to reduce oxides of the metal, pressing the mixture so as to form a blank therefrom, and heating the blank in a nitrogen atmosphere to the sintering temperature of the pulverulent metal so as to sinter the blank simultaneously releasing the reducing gas, whereby due to the presence of the reducing gas a sintered body free of oxides of the metal is formed.

Thus, the disadvantage of prior art methods, namely that sintering had to be carried out in a reducing protective gas atmosphere such as a stream of hydrogen gas, is overcome according to the present invention. Introduction of a reducing gas such as hydrogen has been considered necessary in order to remove the surface oxide layer which is unavoidably found on the entire or part of the surface of the metal particles which are to be sintered together. Unless such oxide skin or surface oxide layer is removed, sintering together of the metal particles cannot be accomplished in a satisfactory manner since the oxide skin interferes with sintering together of the metal particles. In order to obtain a sintered body of the desired quality, such as porosity, it is necessary that the surface portions of adjacent metal particles which are to be sintered together are formed of the metal and not of an oxide of the same.

When using hydrogen gas, such as a stream of hydrogen gas for providing the required reducing gas atmosphere, the danger of explosions is very considerable. Even slight leaks of the apparatus through which oxygen can enter might cause oxyhydrogen explosions, particularly since the hydrogen gas in the sintering furnace will be of elevated temperature and thus highly reactive.

The above described dangers are overcome according to the present invention which defines a sintering method, particularly suitable for the production of sinter electrodes for electric storage batteries, according to which the danger of explosions during the sintering process is substantially eliminated or at least greatly reduced.

This is accomplished, according to the present invention, by admixing to the finely pulverulent metal which is to be sintered such organic compounds, particularly oragno-metallic compounds, which under ambient conditions are solid and which will be subjected to thermal decomposition upon being heated to sintering temperature, and which upon thermal decomposition will develop reducing gases for instance hydrogen gas and/or carbon monoxide.

Organo-metallic compounds used according to the present invention preferably will be such which upon thermal decomposition form reducing gases and a metal of the type which may form the sintered electrode structure, or of a metal which may be included in the active mass, such as cadmium.

Suitable organic compounds which are solid at room temperature and which will decompose at sintering temperature under formation of a reducing gas, include, for instance, nickel glycerate, succinic acid, acetyl acetonate, and particularly good results are obtained with nickel and iron formiates.

The following list of suitable organic compounds is given as illustrative only, without limiting the present invention to the specific compounds mentioned herein:

Aromatic and hydroaromatic compounds such as benzoic acid, phthalic acid, cyclohexylcarboxylic acid, naphthenates, and the organo-metallic compounds thereof; amines, oxims, hydrazones, N-alkyl substituted ethylene diamine, aceto-oxim, urotropine, and their organo-metallic or metallic complex compounds; also oxalic acid, succinic acid, benzoic acid, tartaric acid, citric acid, amides of organic acids such as formamide or acetamide, hexamethylene tetramine, phthalimid; furthermore ammonium salts of organic acids and oxims also were found to be suitable. Of course, all of these compounds must be solid at room temperature so that a pulverulent mixture consisting of these compounds and the metal powder which is to be sintered can be formed. Good results were also obtained with the formiates of cobalt, iron, cadmium, nickel and zinc, as well as with the naphthenates, oxalates and acetyl acetonates of the last mentioned metals, furthermore with cobalt and nickel dioxim.

The sinter electrodes are preferably formed of at least one of the metals iron, nickel, cobalt or zinc. However, the present invention is not to be considered limited to the production of sinter electrodes from one or more of the above mentioned four metals. For instance, the sinter electrodes may also include titanium, tantalum, tungsten, molybdenum, copper or silver.

The quantity of the organic compound relative to the quantity of the metal powder which is to be sintered must be so chosen that the reducing gas produced by decomposition of the organic compound will suffice to reduce the oxide skins of the particles of the metal powder and to prevent oxidation of the metallic surface of these particles. Preferably, between 3 and 30 weight percent of the organic compound will be mixed with 100 parts between 97 and 70 weight percent of the metal powder. However, when the organic compound is a metallo-organic compound, the proportion of the same which is to be admixed to the metal powder should be figured excluding the weight of the metal of the metallo-organic compound. It is preferred to use a considerable excess of organic compounds so that oxidation of the metal powder is prevented with certainty and the oxide skin will be reliably removed.

The metal powders which are to be sintered according to the present invention may vary with respect to bulk weight and particle sizes. Good results are obtained with metal powders having bulk weights approximately within the range described in the examples herein.

The decomposition temperature of the organic compounds must be not higher than the sintering temperature and preferably lower. Generally, it is preferred to use organic compounds which will decompose between about 250° and 450° C.

As stated above, it has been found advantageous to add between 3 and 30 percent by weight of the organic compound to the metal powder which is to be sintered. Preferably, between 5 and 15 percent by weight of the organic compound are mixed with the metal powder.

According to the present invention, it is no longer necessary to introduce a protective gas atmosphere which will be capable of reducing oxides, since the reducing gas which is required for reducing the oxide skin of the metal particles and for maintaining the metal surface of the particles in non-oxidized condition will be formed during the sintering process by decomposition of the organic compound. However, it is possible and within the scope of the present invention to carry out the sintering in an inert atmosphere such as a nitrogen gas atmosphere in order to eliminate the introduction of oxygen from the atmosphere. The provision of a nitrogen or other inert atmosphere is particularly advisable when easily oxidizable metals are to be sintered. When thus operating in an inert gas atmosphere, the function of the reducing gases formed by decomposition of the organic compound will be primarily to reduce the oxide skin of the metal particles. When determining the amount of organic compound which is to be admixed to the metal powder, it must be taken into consideration whether or not the sintering process is to be carried out in a substantially or completely oxygen-free atmosphere, such as a nitrogen gas atmosphere. Obviously, larger quantities of the organic compound will have to be introduced if sintering is to be carried out without nitrogen gas protection.

In order to obtain the desired degree of porosity, it is sometimes desirable, to form a mixture of metal powders varying with respect to the size of the individual metal particles. In this manner, it is possible with a sufficient degree of accuracy to predetermine the pore volume of the finished sintered structure.

Basically, the organic compounds which are mixed with the metal powder according to the present invention must possess the following properties:

(1) The organic compounds must be solid at room temperature so that a mixture of pulverulent organic compounds and metal powder can be formed; and (2) The organic compound must be decomposed under sintering conditions into a reducing gas or gas mixture; or if a metallo-organic compound is used, decomposition under sintering conditions must yield the free metal and reducing gas.

These two conditions are met by a very great number of organic and metallo-organic compounds which are solid at room temperature and which may or may not contain oxygen. Of course, if an oxygen-containing compound is used, the oxygen content of the same must be less than would be required to form water and carbon dioxide with the hydrogen and carbon of the organic molecule.

This condition is for instance met by the nickel salt of formic acid which will be decomposed in a nitrogen atmosphere at elevated temperature to yield metallic nickel and a gaseous mixture consisting of carbon monoxide, water vapors, hydrogen gas and carbon dioxide.

On the other hand, upon decomposition of the iron salt of oxalic acid, metallic iron and carbon dioxide will be formed. Since carbon dioxide is not a reducing gas, the second of the above mentioned conditions is not met by iron oxalate and consequently, iron oxalate does not belong to the group of organic compounds which may be admixed to the metal powder in accordance with the present invention.

Due to the fact that the mixture of metal powder and organic compound while being sintered produces a reducing atmosphere in the sintering area, a protective gas atmosphere is not needed in many cases (however, an inert gas atmosphere such as a nitrogen atmosphere may be provided in order to reduce the relative quantity of organic material or in order to obtain the desired result even of metals which are particularly susceptible to oxidation) and the bond formed in the sintered areas of the particles will be particularly strong. Furthermore, gas formation according to the present invention which can be quantitatively controlled and adjusted, will have a spreading effect on the sintered body, i.e. the porosity of the electrodes can be further controlled by the quantity of gas which is developed from the organic compound during the sintering process. The simultaneous application of a nitrogen or other inert gas atmosphere, has the further advantage, that any residual explosion danger which might exist due to the hydrogen content of the reducing gas evolved upon decomposition of the organic compound will be further reduced due to the diluting effect of the nitrogen atmosphere on hydrogen gas passing outwardly from the sintered body and due to the absence of atmospheric oxygen.

However, emphasis has to be put on the fact that according to the present invention principally no reducing or inert atmosphere or vacuum applied from outside is necessary. The reducing gases set free by the thermal decomposition of the said organic compounds will prevent any oxidation of the metal to be sintered, if the amount of said organic compounds to be added exceeds at least about 3 percent by weight.

The following examples are given as illustrative only, the present invention, however, not being limited to the specific details of the examples.

Example I 25 percent by weight of Mond nickel powder having a bulk weight of 0.81 gram per cubic centimeter are intimately mixed with 5 percent by weight of a finely pulverized nickel formiate. The thus formed mixture is transformed into electrode blanks in a suitable power press under application of a pressure of 30 kilograms per square centimeter. The thus formed blanks are then placed on a graphite support and heated in a sintering furnace to a temperature of 900° C. while passing nitrogen gas as an inert gas through the sintering furnace. The blanks are kept in the furnace at 900° C. for a period of 3 hours. Thereafter, the blanks are allowed to cool while still being maintained in the inert nitrogen atmosphere.

In this manner, firm bodies are obtained sintered throughout and having a pore volume of about 78 percent.

Example II

Finely subdivided iron powder having a bulk weight of 2.6 grams per cubic centimeter and obtained by reduction of ferrous oxide powder in a hydrogen gas stream (ferrum reductum) is mixed with finely pulverized iron formiate so as to obtain an intimate mixture containing 90 percent by weight of the iron powder and 10 percent by weight of iron formiate. Of this mixture, blanks are produced under a pressure of 40 kilograms per square centimeter. The blanks are placed on a graphite plate in a sintering furnace and are heated in a stream of nitrogen gas for 2 hours at a temperature of 870° C.

The thus obtained sintered bodies are firm and possess a pore volume of between about 20 and 22 percent.

Example III 88 percent by weight of a very light nickel powder (Mond nickel), having a bulk weight of 0.36 gram per cubic centimeter are intimately mixed with 12 percent by weight of finely powdered cadmium formiate. Of the thus produced mixture, blanks are made under a pressure of 50 kilograms per square centimeter. The blanks are then placed on a graphite plate in a sintering furnace and are sintered in a nitrogen gas atmosphere for 3½ hours at a temperature of between 780° and 790° C. The thus obtained sintered bodies show high mechanical strength and a large pore volume of about 85 percent. The cadmium contained in the sintered body is in part present in the form of a nickel-cadmium alloy, for instance as $Cd_{21}Ni_5$. The cadmium is electro-chemically reactive and the thus formed sintered bodies are primarily used for electrodes in alkaline storage batteries.

Example IV 45 percent by weight of nickel powder (Mond nickel) having a bulk weight of 0.81 gram per cubic centimeter are mixed with 40 percent by weight of nickel powder having a bulk weight 0.36 gram per cubic centimeter, 5 percent by weight of finely powdered cadmium formiate and 10 percent by weight of ferrous oxalate. Mixing is carried out in a mixing drum until an intimate mixture of the four pulverulent constituents is formed. Blanks are produced of this mixture under a pressure of 30 kilograms per square centimeter and the thus formed blanks are then sintered in a sintering furnace through which a stream of inert nitrogen gas passes. Sintering is carried out at a temperature of about 870° C. for a period of 2½ hours. The sintered bodies are allowed to cool in the inert nitrogen gas atmosphere and are then removed from the sintering furnace. The sintered bodies produced in this manner have a pore volume of between 70 and 75 percent. The iron and cadmium components are primarily present in finely subdivided form as a mixed active mass and are electrochemically reactive when the thus formed sinter body is used as electrode in an alkaline storage battery.

Example V 70 percent of a very light nickel powder (Mond nickel) having a bulk weight of between 0.35 and 0.36 gram per cubic centimeter are mixed with 20 percent by weight of iron powder (ferrum reductum) having a bulk weight of about 2.8 grams per cubic centimeter, 5 percent by weight of pulverulent cadmium salicylate and 5 percent by weight of pulverulent nickel naphthenate. Press blanks are then produced of the thus formed mixture under a pressure of about 30 kilograms per square centimeter. The thus formed blanks are then sintered at a temperature of between 900 and 920° C. for a period of 2½ hours in an inert nitrogen gas atmosphere. The thus formed sintered bodies possess a pore volume of about 55 percent and the iron and cadmium constituents are present to a large degree in an electrochemically active form so that these sinter bodies are primarily suitable to form negative electrodes of alkaline storage batteries.

Example VI 80 percent by weight of an iron powder (ferrum reductum) having a bulk weight of 2.6 grams per cubic centimeter are mixed with 10 percent by weight of pulverulent cadmium benzoate and 10 percent by weight of cadmium formiate. The intimate mixture is then pressed into blanks under a pressure of between about 25 and 27 kilograms per square centimeter. The blanks are sintered in a sintering furnace under a nitrogen gas atmosphere for 3 hours at a temperature of between 770° and 790° C.

The thus produced sintered bodies have a smaller free pore volume of about 23–25 percent and are of great mechnical strength. They are excellently suitable for negative electrodes for alkaline storage batteries, whereby the iron and cadmium of the sintered body is electrochemically reactive as negative active mass.

Example VII 85 percent of Mond nickel powder having a bulk weight of between about 0.35 and 0.36 gram per cubic centimeter are intimately mixed with 4.5 percent by weight of nickel naphthenate, 5.5 percent by weight of iron formiate and 5 percent by weight of cadmium phthalate. After forming pressed blanks under pressure of between 20 and 25 kilograms per square centimeter, the thus formed blanks are sintered on a graphite support in a sintering furnace for 2½ hours at a temperature of between 890° and 900° C. while an inert nitrogen atmosphere is maintained in the sintering furnace. The sintered bodies are allowed to cool while under the nitrogen gas atmosphere.

The thus formed mechanically strong sintered bodies possess a pore volume of about 84–85 percent and are well suitable as negative electrodes for alkaline storage batteries.

Example VIII 90 percent of Mond nickel powder having a bulk weight of between about 0.80 and 0.85 gram per cubic centimeter are mixed with 5 percent by weight of pulverulent cadmium succinate and 5 percent by weight of cadmium diethylene diamine. The thus formed intimate mixture is then compressed into blanks under a pressure of between 35 and 40 kilograms per square centimeter and thereafter placed on a graphite plate in a sintering furnace through which nitrogen gas passes forming an inert protective atmosphere therein. Sintering is then carried out for a period of between 3 and 3½ hours at a temperature of 850° C. The thus formed sintered bodies possess a porosity of between 74 and 76 percent and will serve, suitably shaped, as negative electrodes for alkaline storage batteries.

*Example IX*

86 percent by weight of Mond nickel powder having a bulk weight of between 0.82 and 0.84 gram per cubic centimeter are intimately mixed with 6 percent by weight of nickel oxalate and 8 percent by weight of cobalt formiate. Mixing of the pulverulent constituents is carried out in a mixing drum. The thus formed intimate mixture is then compressed under a pressure of 30 to 35 kilograms per square centimeter into suitably shaped blanks. The blanks are then placed on graphite plates and together with the latter into a vacuum sinter furnace. At a temperature of between about 130° and 140° C., the sinter furnace is then evacuated until the residual pressure is below 1 millimeter mercury. After reaching such degree of partial vacuum, the temperature in the furnace is raised to between 850° and 870° C. and is maintained at this level for about 2½ hours during which time the vacuum is also maintained at below 1 millimeter mercury partial pressure. Thereafter, the furnace and its contents are allowed to cool while the vacuum is maintained. The cooled sintered bodies are then removed from the furnace, and it is found that they have a pore volume of between about 75 and 77 percent.

*Example X*

A mixture consisting of 85 percent by weight of Mond nickel powder having a bulk weight of between 0.35 and 0.36 gram per cubic centimeter, 10 percent by weight of pulverulent cadmium naphthenate and 5 percent by weight of iron formiate is compressed into blanks under a pressure of between 30 and 35 kilograms per square centimeter. The thus formed blanks are then sintered on a graphite support in a vacuum sinter oven by being first heated to about 130° to 140° C. whereupon the furnace is evacuated until the residual pressure is below 1 millimeter mercury. Thereafter, the temperature is raised to between 875° and 885° C. and sintering is carried out at such temperature for a period of 2 hours. The sintered bodies are then cooled while the vacuum is still maintained. The pore volume of the thus produced sintered bodies is between 78 and 80 percent.

*Example XI*

97 percent by weight of very light nickel powder (Mond nickel), having a bulk density of 0.35 gram per cubic centimeter are intimately mixed with 3 percent by weight of finely powdered cadmium formiate. Of this mixture, blanks are produced under a pressure of 55 kilograms per square centimeter. They are placed on a graphite plate in a sintering furnace. The furnace is then closed so that no renewal of air is possible and the blanks are sintered at a temperature of between 820–830° C. for 3 hours.

The thus obtained sintered bodies show good mechanical strength and have a pore volume of about 80 to 82 percent.

*Example XII*

30 percent by weight of an iron powder (ferrum reductum) having a bulk density of 2.6 grams per cubic centimeter are mixed with 65 percent by weight of powdered Mond nickel having a bulk density of between 0.81–0.83 gram per cubic centimeter and 2.5 percent by weight of iron formiate and 2.5 percent by weight of cadmium benzoate are intimately mixed. After forming blanks under a pressure of between 25 and 30 kilograms per square centimeter, the thus formed blanks are placed on a graphite support in a sintering furnace. The furnace is then closed against the outer air, to prevent any oxygen of the air getting to the blanks. The blanks are then sintered at a temperature of between 850–870° C. for 2½ to 3 hours. The thus produced sintered bodies are allowed to cool down in the furnace to temperatures below about 35° C.

The mechanically strong sintered bodies possess a porosity of about 65–70 percent and are well suited as negative electrodes for alkaline storage batteries.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing porous sinter electrodes for alkaline storage batteries, comprising the steps of forming an intimate mixture of a metal powder adapted to be sintered and of a pulverulent oxganometallic compound adapted upon heating to the sintering temperature of said metal powder to form a gaseous decomposition product including a reducing gas and a metal adapted to be at said sintering temperature; pressing said mixture so as to form an electrode blank; and heating the thus formed electrode blank to said sintering temperature so as to sinter said metals and simultaneously to release said reducing gas the latter preventing oxidation of said metals, whereby a porous sinter electrode substantially free of oxides of said metals is formed.

2. A method of producing porous sinter electrodes, comprising the steps of forming an intimate mixture of an oxidizable metal powder adapted to be sintered and of a pulverulent organometallic compound adapted upon heating to the sintering temperature of said metal powder to form free metal and also to form a gaseous decomposition product including a reducing gas and with any solid residue being free of carbon; and heating the thus formed mixture in an inert gas atmosphere to the sintering temperature of said metal powder so as to sinter the same and said free metal and simultaneously to release said reducing gas the latter reducing any oxidized portions of said metal, whereby a porous sinter electrode substantially free of oxides of said metal is formed.

3. A method of producing a porous sinter electrode adapted to form an electrode for an alkaline storage battery, comprising the steps of forming an intimate mixture of a pulverulent metal selected from the group consisting of iron, nickel, zinc, cobalt, titanium, tantalum, tungsten, molybdenum, copper and silver, and of a pulverulent organometallic compound adapted upon heating to the sintering temperature of said pulverulent metal to form a gaseous decomposition producing including a reducing gas and free metal, said reducing gas being adapted to reduce oxides of said metal; pressing said mixture so as to form a blank therefrom; and heating said blank to the sintering temperature of said pulverulent metal so as to sinter said blank and simultaneously to release said reducing gas, whereby due to the presence of said reducing gas a porous sintered electrode free of oxides of said metal is formed.

4. A method of producing a porous sinter electrode adapted to for man electrode for an alkaline storage battery, comprising the steps of forming an intimate mixture of a pulverulent metal selected from the group consisting of iron, nickel, zinc, cobalt, titanium, tantalum, tungsten, molybdenum, copper and silver, and of a pulverulent organometallic compound adapted upon heating to the sintering temperature of said pulverulent metal to be decomposed under formation of a metal and of a gaseous decomposition product including a reducing gas adapted to reduce oxides of said metal; pressing said mixture so as to form a blank therefrom; and heating said blank in an inert gas atmosphere to the sintering temperature of said pulverulent metal so as to sinter said blank simultaneously releasing said reducing gas, whereby due to the presence of said reducing gas a porous sinter electrode free of oxides of said metal is formed.

5. A method of producing a porous sinter electrode adapted to form an electrode for an alkaline storage battery, comprising the steps of forming an intimate mixture of between 97 and 70 percent by weight of a pulverulent metal selected from the group consisting of iron, nickel, zinc, cobalt, titanium, tantalum, tungsten, molybdenum, copper and silver, and of between 3 and 30 percent by weight of a pulverulent organometallic compound adapted upon heating ot the sintering temperature of said pulverulent metal to be decomposed under formation of metal and of a gaseous decomposition product including a reducing gas adapted to reduce oxides of said pulverulent metal; pressing said mixture so as to form a blank therefrom; and heating said blank in a nitrogen atmosphere to the sintering temperature of said pulverulent metal so as to sinter said blank simultaneously releasing said reducing gas, whereby due to the presence of said reducing gas a porous sinter electrode free of oxides of said metal is formed.

6. A method of producing a porous sinter electrode adapted to form an electrode for an alkaline storage battery, comprising the steps of forming an intimate mixture of between 95 and 85 percent by weight of a pulverulent metal selected from the group consisting of iron, nickel, zinc, cobalt, titanium, tantalum, tungsten, molybdenum, copper and silver, and of between 5 and 15 percent by weight of a pulverulent organometallic compound adapted upon heating to the sintering temperature of said pulverulent metal to be decomposed under formation of metal and of a gaseous decomposition product including a reducing gas adapted to reduce oxides of said pulverulent metal; pressing said mixture so as to form a blank therefrom; and heating said blank in a nitrogen atmosphere to the sintering temperature of said pulverulent metal so as to sinter said blank simultaneously releasing said reducing gas, whereby due to the presence of said reducing gas a porous sinter electrode free of oxides of said metal is formed.

7. A method of producing a porous sinter electrode adapted to form an electrode for an alkaline storage battery, comprising the steps of forming an intimate mixture of pulverulent nickel and of a pulverulent organometallic compound adapted upon heating to the sintering temperature of said pulverulent nickel to be decomposed under formation of a metal and of a gaseous decomposition product including a reducing gas adapted to reduce oxides of said nickel; pressing said mixture so as to form a blank therefrom; and heating said blank in an inert gas atmosphere to the sintering temperature of said pulverulent nickel so as to sinter said blank simultaneously releasing said reducing gas, whereby due to the presence of said reducing gas a porous sinter electrode free of oxides of said nickel is formed.

8. A method of producing a porous sinter electrode adapted to form an electrode for an alkaline storage battery, comprising the steps of forming an intimate mixture of pulverulent iron and of a pulverulent organometallic compound adapted upon heating to the sintering temperature of said pulverulent iron to be decomposed under formation of a metal and of a gaseous decomposition product including a reducing gas adapted to reduce oxides of said iron; pressing said mixture so as to form a blank therefrom; and heating said blank in an inert gas atmosphere to the sintering temperature of said pulverulent iron so as to sinter said blank simultaneously releasing said reducing gas, whereby due to the presence of said reducing gas a porous sinter electrode free of oxides of said iron is formed.

9. A method of producing a porous sinter electrode adapted to form an electrode for an alkaline storage battery, comprising the steps of forming an intimate mixture of pulverulent cobalt and of a pulverulent organometallic compound adapted upon heating to the sintering temperature of said pulverulent cobalt to be decomposed under formation of a metal and of a gaseous decomposition product including a reducing gas adapted to reduce oxides of said cobalt; pressing said mixture so as to form a blank therefrom; and heating said blank in an inert gas atmosphere to the sintering temperature of said pulverulent cobalt so as to sinter said blank simultaneously releasing said reducing gas, whereby due to the presence of said reducing gas a porous sinter electrode free of oxides of said cobalt is formed.

10. A method of producing a porous sinter electrode adapted to form an electrode for an alkaline storage battery, comprising the steps of forming an intimate mixture of pulverulent zinc and of a pulverulent organometallic compound adapted upon heating to the sintering temperature of said pulverulent zinc to be decomposed under formation of a metal and of a gaseous decomposition product including a reducing gas adapted to reduce oxides of said zinc; pressing said mixture so as to form a blank therefrom; and heating said blank in an inert gas atmosphere to the sintering temperature of said pulverulent zinc so as to sinter said blank simultaneously releasing said reducing gas, whereby due to the presence of said reducing gas a porous sinter electrode free of oxides of said zinc is formed.

11. A method of producing a porous sinter electrode adapted to form an electrode for an alkaline storage battery, comprising the steps of forming an intimate mixture of a pulverulent metal selected from the group consisting of iron, nickel, zinc, cobalt, titanium, tantalum, tungsten, molybdenum, copper and silver, and of a pulverulent organometallic compound adapted upon heating to the sintering temperature of said pulverulent metal to be decomposed under formation of a metal and of a gaseous decomposition product including a reducing gas adapted to reduce oxides of said metal, said metal organic compound being selected from the group consisting of the formiates, phthalates, naphthenates, salicylates, benzoates, oxalates and acetyl acetonates of cobalt, iron, nickel, zinc and cadmium, and the dioximes of cobalt and nickel; pressing said mixture so as to form a blank therefrom; and heating said blank in an inert gas atmosphere to the sintering temperature of said pulverulent metal so as to sinter said blank simultaneously releasing said reducing gas, whereby due to the presence of said reducing gas a porous sinter electrode free of oxides of said metal is formed.

12. A method of producing a porous sinter electrode adapted to form an electrode for an alkaline storage battery, comprising the steps of forming an intimate mixture of a pulverulent metal selected from the group consisting of iron, nickel, zinc, cobalt, titanium, tantalum, tungsten, molybdenum, copper and silver, and of nickel formiate as a pulverulent organometallic compound adapted upon heating to the sintering temperature of said pulverulent metal to be decomposed under formation of a metal and of a gaseous decomposition product including a reducing gas adapted to reduce oxides of said metal; pressing said mixture so as to form a blank therefrom; and heating said blank in an inert gas atmosphere to the sintering temperature of said pulverulent metal so as to sinter said blank simultaneously releasing said reducing gas, whereby due to the presence of said reducing gas a porous sinter electrode free of oxides of said metal is formed.

13. A method of producing a porous sinter electrode adapted to form an electrode for an alkaline storage battery, comprising the steps of forming an intimate mixture of a pulverulent metal selected from the group consisting of iron, nickel, zinc, cobalt, titanium, tantalum, tungsten, molybdenum, copper and silver, and of iron formiate as a pulverulent organometallic compound adapted upon heating to the sintering temperature of said pulverulent metal to be decomposed under formation of a metal and of a gaseous decomposition product including a reducing gas adapted to reduce oxides of said metal; pressing said mixture so as to form a blank therefrom; and heating said blank in an inert gas atmosphere to the sintering temperature of said pulverulent metal so as to sinter said blank simultaneously releasing said reducing gas, whereby due to the presence of said reducing gas a porous sinter electrode free of oxides of said metal is formed.

14. A method of producing a porous sinter electrode adapted to form an electrode for an alkaline storage battery, comprising the steps of forming an intimate mixture of pulverulent nickel and of nickel formiate as a pulverulent metal-organic compound adapted upon heating to the sintering temperature of said pulverulent metal to be decomposed under formation of a metal and of a gaseous decomposition product including a reducing gas adapted to reduce oxides of said metal; pressing said mixture so as to form a blank therefrom; and heating said blank in an inert gas atmosphere to the sintering temperature of said pulverulent metal so as to sinter said blank simultaneously releasing said reducing gas, whereby due to the presence of said reducing gas a porous sinter electrode free of oxides of said metal is formed.

15. A method of producing a porous sinter electrode adapted to form an electrode for an alkaline storage battery, comprising the steps of forming an intimate mixture of between 97 and 70 percent by weight of a pulverulent metal selected from the group consisting of iron, nickel, zinc, cobalt, titanium, tantalum, tungsten, molybdenum, copper and silver, and of between 3 and 30 percent by weight of a pulverulent organometallic compound adapted upon heating to the sintering temperature of said pulverulent metal to be decomposed under formation of a metal and of a gaseous decomposition product including a reducing gas adapted to reduce oxides of said metal; pressing said mixture so as to form a blank therefrom; and heating said blank in a nitrogen atmosphere to the sintering temperature of said pulverulent metal so as to sinter said blank simultaneously releasing said reducing gas, whereby due to the presence of said reducing gas a porous sinter electrode free of oxides of said metal is formed.

References Cited in the file of this patent
UNITED STATES PATENTS

| | | |
|---|---|---|
| 1,988,861 | Thorausch | Jan. 22, 1935 |
| 2,119,489 | Beer | May 31, 1938 |
| 2,622,024 | Gurnick | Dec. 16, 1952 |